Oct. 14, 1941.  A. LYSHOLM ET AL  2,258,684
VARIABLE SPEED POWER TRANSMISSION
Filed June 26, 1936  3 Sheets-Sheet 1

INVENTORS
BY
ATTORNEY.

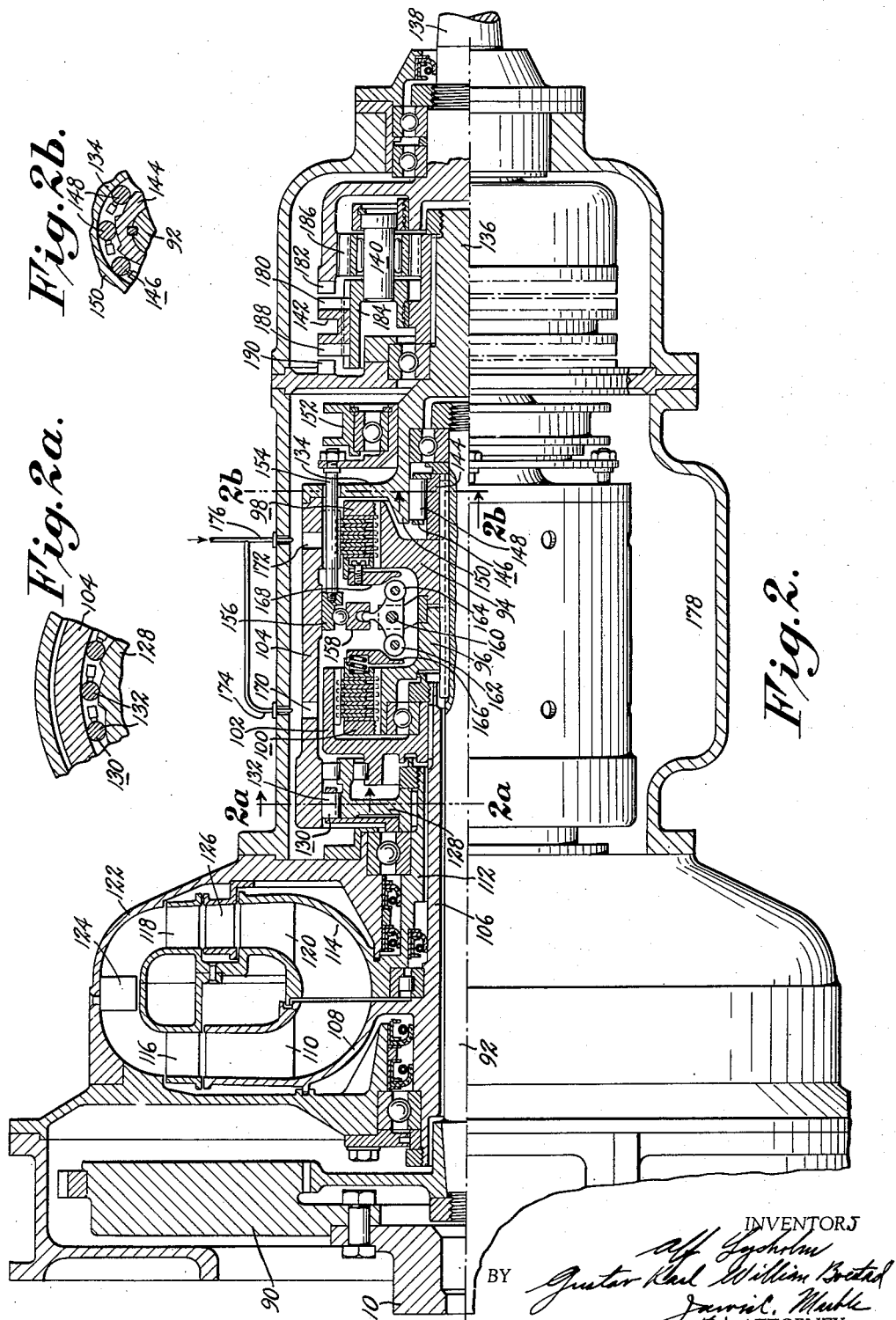

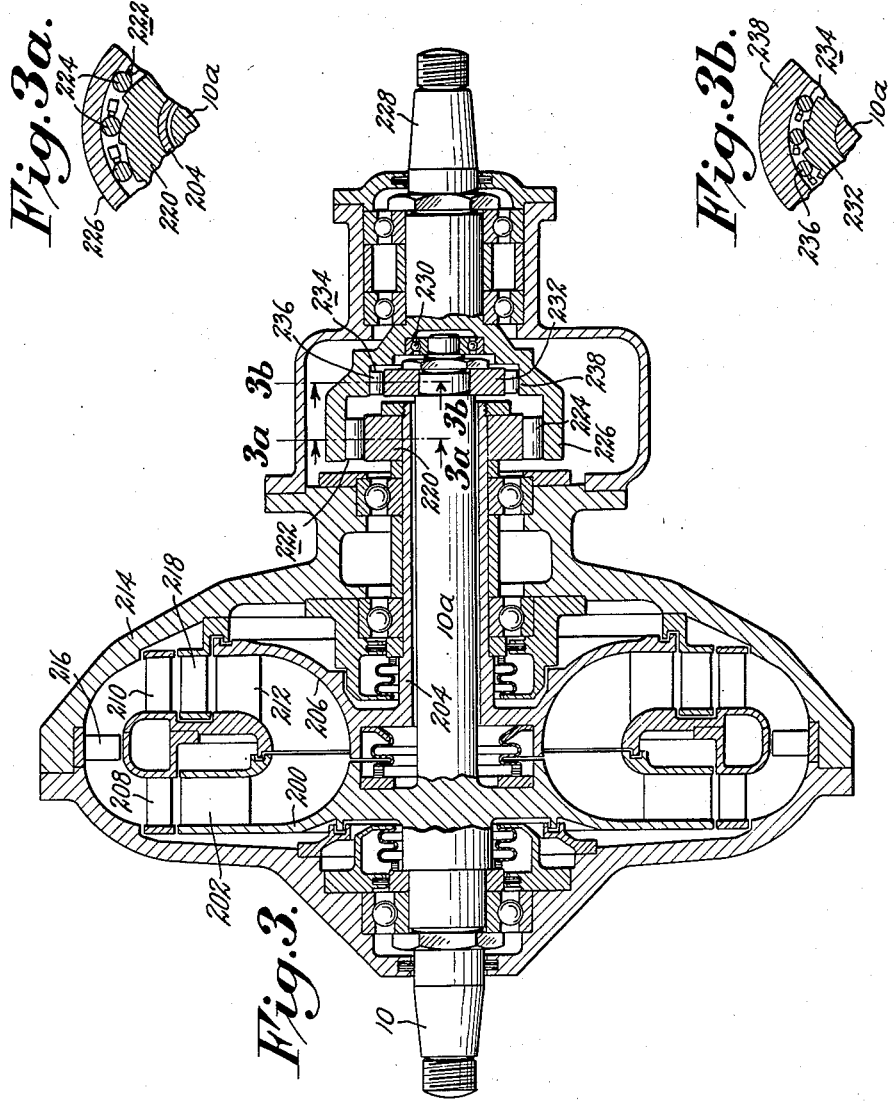

Patented Oct. 14, 1941

2,258,684

UNITED STATES PATENT OFFICE 2,258,684

VARIABLE SPEED POWER TRANSMISSION

Alf Lysholm, Stockholm, and Gustav Karl William Boestad, Lidingo, Sweden, assignors, by mesne assignments, to Jarvis C. Marble, Leslie M. Merrill, and Percy H. Batten, trustees Application June 26, 1936, Serial No. 87,380 In Germany July 2, 1935

13 Claims. (Cl. 192—3.2)

The present invention relates to variable speed power transmissions and has particular reference to hydraulic variable speed power transmissions of the kind in which power is transmitted from a pump wheel to a turbine wheel through the medium of liquid circulated by the pump wheel in a common working chamber in which both the pump and turbine wheels are situated. Still more particularly the invention relates to transmissions of the above described character in which there is combined with the hydraulic power transmitting mechanism, means for transmitting power directly from the power input shaft to the driven or power output shaft.

The general object of the invention is to improve upon prior forms of construction of transmissions of the above described character and to provide for improved vehicle braking through the use of the transmission apparatus. It is a further object of the invention to provide an improved arrangement of parts in transmission apparatus of the kind described which embodies the direct drive feature as well as the hydraulic drive. Other and more detailed objects of the invention together with the advantages to be derived from its use will appear more clearly in the ensuing description of suitable forms of apparatus for carrying the invention into effect.

In the drawings forming a part of this specification and illustrative of the embodiments hereinafter described:

Fig. 2 is a more or less diagrammatic section similar to Fig. 1 showing another form of apparatus embodying the invention;

Fig. 2a is a fragmentary transverse section taken on the line 2a—2a of Fig. 2;

Fig. 2b is a section similar to Fig. 2a taken on the line 2b—2b of Fig. 2;

Fig. 3 is a more or less diagrammatic section similar to Fig. 1 showing still another form of apparatus embodying the invention;

Fig. 3a is a fragmentary transverse section taken on the line 3a—3a of Fig. 3; and Fig. 3b is a section similar to Fig. 3a taken on the line 3b—3b of Fig. 3.

Figures 1, 1A, 1B:
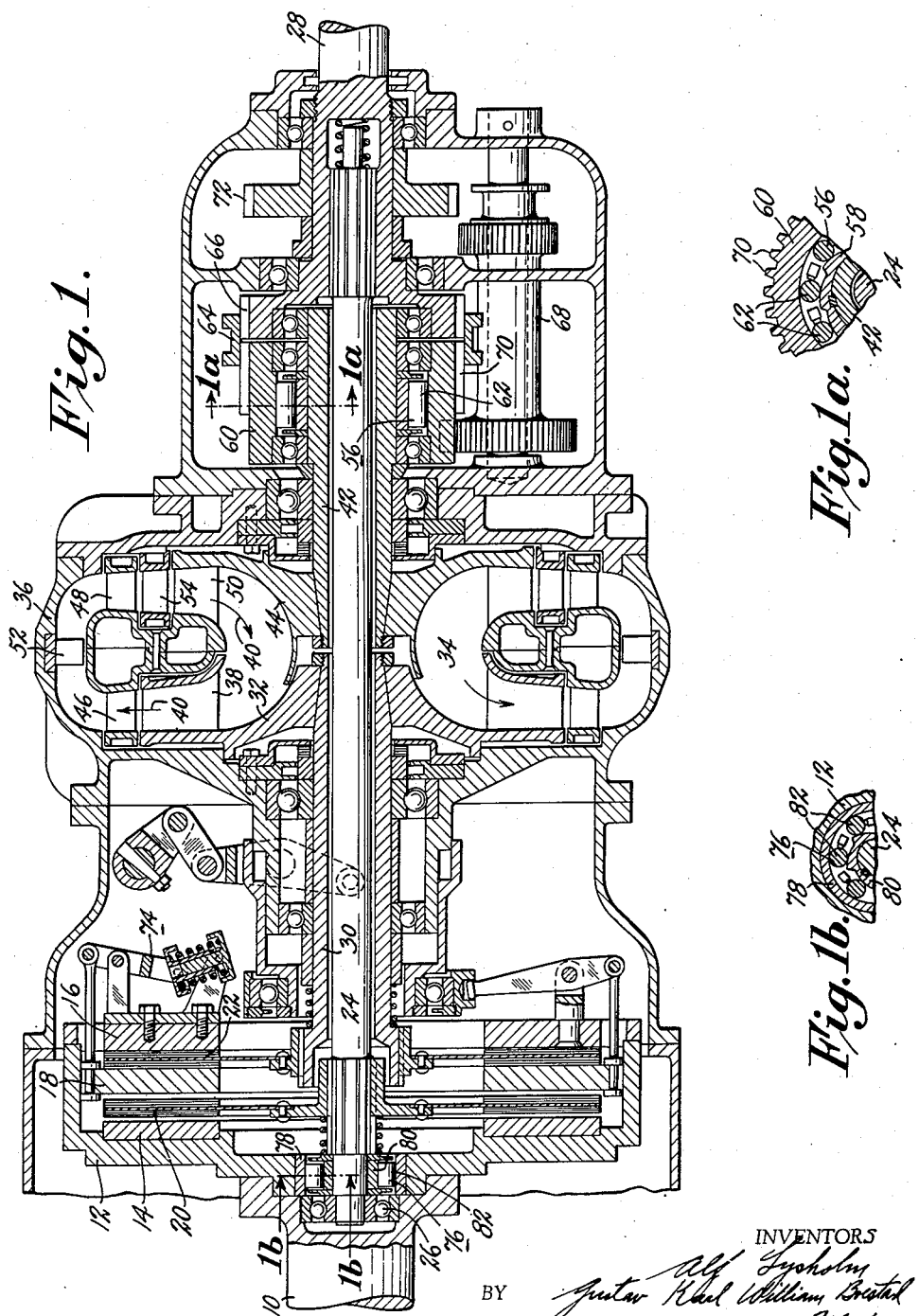
Fig. 1 is a more or less diagrammatic longitudinal central section of a transmission embodying the invention.
Fig. 1a is a fragmentary transverse section taken on the line 1a—1a of Fig. 1.
Fig. 1b is a section similar to Fig 1a taken on the line 1b—1b of Fig. 1.

Referring now more particularly to Fig. 1, 10 indicates a driving shaft which may for example be the crank shaft of a vehicle engine. This shaft is connected to a double acting mechanical clutch which is advantageously contained in and formed in part by a casing 12 which may serve as the engine fly wheel. The casing 12 is formed in part by the friction discs 14 and 16 between which there is disposed the axially displaceable pressure plate 18 which is grooved or keyed so as to rotate with the casing 12. A driven clutch disc 20 is disposed between the pressure plate 18 and the friction disc 14 and a second driven clutch disc 22 is disposed between the pressure plate and the friction disc 16. The driven disc 20 is fixed to a central shaft 24 which at its forward end is supported by bearing 26 and which at its rearward end is fixed to the driven shaft 28 which may for example be the propeller or other drive shaft of a vehicle.

The driven clutch disc 22 is connected to a rotatably mounted hollow shaft part 30 surrounding a part of the central shaft 24 and carrying the pump wheel 32 which is disposed in a working chamber 34 within the stationary casing 36. The pump wheel 32 carries a ring of pump blades 38 which upon rotation circulate working liquid in chamber 34 in the direction of the arrows 40.

A rotatably mounted hollow shaft part 42, which surrounds another part of the central shaft 24, carries the turbine wheel 44 which is provided with three rows of turbine blades 46, 48 and 50. The casing 36 carries two rows of stationary guide blades 52 and 54.

Upon circulation of the working liquid in the direction of the arrows 40, power is transmitted from the pump wheel to the turbine wheel in known manner, the turbine wheel absorbing energy from the liquid which tends to cause it to rotate in the same direction as the direction of rotation of the pump wheel.

The hollow shaft part 42 which carries the turbine wheel transmits power through an overrunning clutch indicated generally at 56 and shown in section in Fig. 1a. In the embodiment illustrated, this clutch is of the roller type comprising an inner race 58 attached to the part 42 and an outer race 60. Between the races there are disposed a number of clutch rollers 62.

The outer race of the clutch 56 is adapted to be connected by means of the shift ring 64 to the part 66 which is directly connected to the driven shaft 28. In the embodiment illustrated, a reverse gear of the sliding spur type is shown comprising a countershaft gear cluster 68 adapted to be shifted to the right so that power is transmitted from the gear teeth 70 on the outer race of the overrunning clutch through the gear cluster and an idler gear (not shown) to the gear 72 fixed to the driven shaft part 28. Before the gear cluster is shifted to provide reverse drive, the shift ring 64 is shifted to the right out of engagement with the gear teeth 70, so as to break the direct driving connection provided between the part 60 and the driven member 28 when the shift ring is in the position shown in the figure.

The driven clutch discs 20 and 22 are arranged to be engaged alternatively by the pressure plate 18 which is in turn adapted to be shifted under the control of the operator through the medium of a toggle mechanism, indicated generally at 74. The hereinbefore described features of construction are substantially the same as disclosed in U. S. Patent 1,900,119, granted March 7, 1933, and need not be further described in detail for an understanding of the present invention.

In the present form of construction a second free wheel clutch, indicated generally at 76, is provided between the driving and the driven shafts and in this embodiment this clutch is located between a part of the housing 12 which is connected with the driving shaft 10 and the forward end of the central shaft 24. The clutch illustrated is of the overrunning roller type having an outer race 78 fixed in the housing 12 and an inner race 80 mounted on the shaft 24. Between the races there is disposed a plurality of clutch rollers 82, as indicated more clearly in Fig. 1b.

Operation of the apparatus is as follows, it being assumed that the drive to the transmission is "right hand," that is clockwise when viewed from the left of the figure. Of the parts shown in the position in the figure, power is transmitted through the driven clutch disc 22 to the pump wheel. Power is transmitted from the pump wheel through the working fluid to the turbine wheel and from the latter through the overrunning clutch 56 to the driven shaft 28. Assuming that the driving shaft 10 is rotated at higher speed than the driven shaft 28, the overrunning clutch 76 will overrun and this condition obtains as long as the power is being transmitted from the driving shaft to the driven shaft through the hydraulic mechanism.

When direct drive is desired, the pressure plate 18 is shifted to the left so as to engage the driven clutch disc 20 and disengage the driven clutch disc 22. With the pressure plate in this position, power is transmitted directly through shaft 24 to the driven shaft 28. Since the driven clutch disc 22 is disengaged, the pump wheel is idle and because of the overrunning clutch 56 interposed between the driven shaft and the turbine member of the hydraulic apparatus, the turbine rotor 44 is also idle. Consequently the hydraulic parts are at rest under this condition of drive.

It will be understood of course that when in direct drive with the driven clutch plate 20 engaged, there is no relative rotational movement between the driving and the driven shafts and consequently all parts of the overrunning clutch 76 rotate as a unit at the same speed.

If the apparatus is installed in a vehicle and it is desired to be utilized as a means for braking, all that is required is for the source of motive fluid to the engine or other driving means to be diminished to a degree such that the driven shaft tends to rotate at a speed greater than that of the driving shaft. When this occurs. the overrunning clutch 75 takes hold and connects the driving shaft to the driven shaft. Upon engagement of the clutch 76, the pump wheel is caused to rotate at the speed of the driven shaft and the turbine wheel will run idly due to the circulation of motive fluid caused by rotation of the pump wheel.

Resistance to circulation of the working fluid is offered by the stationary guide blades 52 and 54 so that the rotating pump wheel will do a certain amount of work regardless of the fact that power is not being transmitted from the turbine wheel to the driven shaft. The drag represented by the necessary power required to effect this idle circulation of the working fluid through the blade system of the hydraulic mechanism provides a substantial braking force which is added to the braking force represented by the drag of the engine or other power unit connected to the driving shaft.

The effect is therefore to enhance the braking effort ordinarily obtained by causing a vehicle in direct drive to drive an idle motor and is like the effect produced when in order to enhance such braking effect with an ordinary gear transmission, the vehicle is made to drive an idle motor at higher speed by causing it to drive the motor through a transmission which is placed in a geared position rather than in direct drive position.

When the second overrunning clutch is embodied in apparatus of the kind above described, which apparatus includes direct drive mechanism as well as hydraulic drive mechanism, it is possible to secure two separate and different degrees of braking effect. In one case when the apparatus is set for direct drive and motive power is reduced or cut off, the braking effect of the engine alone may be secured. By cutting off or reducing the motive power with the apparatus set for hydraulic drive, the present arrangement permits the braking effect of the motor, enhanced by the additional braking effect of the hydraulic mechanism, to be employed, thus securing an enhanced degree of braking.

In addition to affording the desired braking above described, employment of the second overrunning clutch results in another highly desirable operating function since this clutch permits the mechanism to be shifted from hydraulic drive to direct drive without frictional wear of the parts of the friction clutch through which the direct drive is transmitted.

When the friction clutch through which power is transmitted to the hydraulic mechanism is engaged, there is substantially no wear on this clutch because of the resilient nature of the hydraulic power transmitting apparatus. When shifting from hydraulic drive to direct drive, the drive to which the shift is made is substantially a rigid drive and any difference in speed between the clutch parts at the time of engagement must ordinarily be taken up by frictional slipping of the clutch parts until synchronous speed is reached. With the kind of hydraulic torque converting mechanism herein disclosed, the driven shaft normally never reaches the same speed as that of the driving shaft and when shift to direct drive is made there may be a substantial speed differential between the driving and driven portions of the direct drive clutch at the time it is engaged.

With the present arrangement, wear on the frictional clutch parts due to the slipping necessary to synchronize different clutch part speeds may readily be avoided by reducing or cutting off the power input to the apparatus at the time shift is made from hydraulic drive to direct drive. With the power cut off or reduced, the driven shaft will tend to overrun the driving shaft and the overrunning clutch between these parts will take hold and cause them to rotate at the same speed. Since the direct drive clutch serves to connect the driving and driven shaft parts, it will be seen that when the power control is properly manipulated, the overruning clutch acts as a synchronizer so that the driving and driven parts of the direct drive clutch are brought to equal speed before this clutch is engaged. Once the clutch is engaged, normal power transmission through it does not result in wear on the frictional engaging surfaces and the present arrangement therefore enables wear to be substantially reduced.

In the embodiment illustrated in Fig. 2 and related figures, the driving shaft 10 is connected directly to the engine fly wheel 90 which is in turn keyed or otherwise rotationally fixed on the central shaft 92 rotatably mounted at the axis of the transmission. At its rearward end, shaft 92 has splined thereon the inner clutch members 94 and 96 of multiple disc clutches indicated generally at 98 and 100 respectively. Members 94 and 96 carry the driving discs of these clutches, the driven discs of which are carried respectively by member 102 and sleeve member 104, the latter encircling both clutch assemblies. Member 102 is fixed rotationally on the hollow shaft part 106 which surrounds the central shaft 92 and carries the pump wheel 108 having the row of pump blades 110.

The rotatably mounted hollow shaft part 112 is mounted around the shaft part 106 and at its forward end carries the turbine wheel 114 having the three rows of turbine blades 116, 118 and 120. The casing 122 carries the rows of stationary guide blades 124 and 126.

The hollow shaft part 112 has fixed thereto the inner race member 128 of the overrunning clutch indicated generally at 130, the rollers 132 of which are disposed between the inner race member and the sleeve member 104 which forms the outer race of the clutch.

The sleeve member 104 is carried by and forms an extension of a rotatably mounted member 134, the shaft portion 136 of which constitutes in effect the driven member of the transmission device. In the embodiment illustrated, the member 134 is connected to the driven shaft 138 through the medium of a planetary type reverse gear indicated generally at 140, forward and reverse rotation of the driven shaft 138 being effected by shift of the reverse control shift ring 142. The specific details of the reverse gear are not germane to the present invention.

Splined to the rearward end of shaft 92 is the inner race 144 of a second overrunning roller clutch indicated generally at 146, the rollers 148 of which are disposed between the inner race and an outer race 150 formed by an axial annular extension of the member 134.

A clutch shift ring 152 is carried by the outer race of a ball bearing mounted externally of the member 134. A number of axially extending shift pins 154, extending through suitable apertures in member 134, are connected to the inner race of the ball bearing so as to be shifted axially upon axial movement of the shift ring 152. At their inner ends these pins serve to support the outer race 156 of a shift bearing, the inner race 158 of which is recessed to engage a member pivoted at 160 and having arms which carry respectively the rollers 162 and 164. These rollers are adapted to respectively engage, in alternation, the cam plates 166 and 168 which when respectively engaged, serve to exert pressure upon and engage either one or the other of the clutches 98 and 100.

For purposes of lubricating the clutch mechanism housed within the sleeve member 104, the latter is advantageously provided with a series of openings indicated at 170 and 172 to which lubricating oil is fed by gravity from the oil feed lines 174 and 176 connected to any suitable source of supply of lubricating oil. Excess oil flows by gravity or is thrown off the surface of the sleeve member and finally reaches the oil sump 178.

The operation of the apparatus is as follows, again assuming rotation of the driving shaft to be right hand or clockwise when viewed from the left of the figure. With the parts as shown in the drawings, the clutches 98 and 100 are both disengaged and no power is transmitted through the mechanism from the driving shaft. If now the shift collar 152 is shifted to the right from the position shown, the direct drive clutch 100 will be engaged and power will be transmitted through member 102 to the shaft part 106 and thence to the pump wheel. Power transmitted from the pump wheel to the turbine wheel through the working fluid will be transmitted by way of the shaft part 112 and the overrunning clutch 130 to the sleeve 104 from which it will be transmitted to the shaft part 136 of the member 134.

From the shaft part 136, power will be transmitted to the driven shaft 138 in either forward or reverse direction depending upon the position of the reverse gear shift ring 142. The reverse gear, shown by way of illustration, is of a known type of planetary gearing and if forward drive is desired, shift ring 142 is moved to the right from the position shown in the drawings so that the dog clutch elements 180 engage cooperating elements 182 on an extension of the driven shaft part 138. Since the shift ring 142 is splined onto the pinion carrier 184, the pinions 186 are prevented from rotating about their own individual axes and the parts 136 and 138 are locked against relative rotation with respect to each other by the pinions which act as force transmitting members. If reverse drive is desired, the shift ring 142 is moved to the left so that the dog clutch elements 188 on the left side of the ring engage the fixed clutch elements 190 formed on a part of the stationary casing structure. In this position of the shift ring, the pinion carrier is prevented from rotating and drive in reverse direction from the part 136 to the part 138 is effected by means of the pinions rotating about their own axes.

For the purposes of further description of this embodiment, we will assume that the shift ring 142 is shifted to its right hand position to effect forward drive.

If direct drive is desired, the shift ring 152 is moved to its left hand position to engage the clutch 98. This movement automatically releases clutch 100 in case the previous position of the control engaged the latter clutch. With clutch 98 engaged, drive is transmitted from the central shaft 92 directly to the sleeve member 104 to which the driven discs of this clutch are attached and power is transmitted from the sleeve member to the driven shaft 138 through the member 134 and the locked reverse gear mechanism.

In the direct drive position of the apparatus, as in the previously described embodiment, the hydraulic mechanism is idle and stationary since clutch 100 for transmitting power to the pump wheel is disconnected and the overrunning clutch 130 prevents drive from being transmitted from the sleeve 104 to the shaft part 112 of the turbine member.

As in the preceding embodiment, the second overrunning clutch, that is, the clutch 146, serves to connect the driving shaft 10 to the driven shaft 138 when the latter tends to rotate at a higher speed than the former. If, with clutch 146 in engagement, the mechanism is set for hydraulic drive (that is, with clutch 100 engaged), the drive is transmitted from shaft 138 through clutch 146 to shaft 92 and from the latter shaft through clutch 100 to the pump wheel. Consequently, as long as the driven shaft is tending to rotate at a higher speed than the driving or engine shaft, the driven shaft will be subjected to the drag or braking effect produced by rotation of the pump wheel in addition to any drag or braking effect derived from the engine.

As in the previously described embodiment, the second overrunning clutch 146 can be operated as a synchronizing clutch to synchronize, prior to the engagement of the direct drive clutch 98, the speeds of rotation of the driving and driven parts of the latter clutch.

In the present embodiment, it will be observed that all of the clutch structure is disposed to one and the same side of the hydraulic power transmitting mechanism. This arrangement has numerous practical advantages of importance, particularly for vehicle transmissions which are directly connected to engines.

When this arrangement is employed, it is possible to place the hydraulic mechanism closely adjacent to the fly wheel or bell housing of the engine and the characteristics of the hydraulic mechanism are such that in many instances, as shown in the figure, the overall diameter of the hydraulic casing is of the same order as that of the fly wheel or bell housing of the engine. The clutches, particularly when multiple disc clutches are employed, may be of very much smaller diameter than that of the fly wheel and with the arrangement shown a much more advantageous and compact arrangement is provided since the clutch mechanism, if interposed between the hydraulic mechanism and the fly wheel, would necessitate placing the hydraulic casing of relatively large diameter, a substantial distance away from the engine casing. This arrangement is not only disadvantageous but in many instances impractical in the case of vehicle installations, particularly for automobiles where the space for direct connected transmission parts is very small. With the arrangement shown, the large diameter portion of the transmission casing may be confined to the engine end where there is usually room for it, while the portion which projects a substantial distance from the engine is of comparatively small diameter and of such size that it can be accommodated in the space available.

Furthermore, from the standpoint of replacement and repair, the clutch mechanisms, which contain many more wearing parts than the hydraulic mechanism, are, with the present arrangement, readily accessible and easily detachable from the remainder of the casing structure, which would not be the case with the clutch mechanisms distributed on both sides of the hydraulic parts.

In Fig. 3 there is illustrated a further embodiment of the invention, applied to a hydraulic power transmission which does not embody the direct drive in addition to the hydraulic drive. In this arrangement the driving shaft 10 has mounted directly thereon the pump wheel 200 which carries the pump blades 202. An extension 10a of the driving shaft passes through a hollow shaft part 204 which carries the turbine wheel 206 having the rows of turbine blades 208, 210 and 212. The casing 214 carries the rows 216 and 218 of stationary guide blades. At its rearward end the shaft part 204 carries the inner race 220 of the overrunning roller clutch indicated generally at 222. The rollers 224 of this clutch transmit power to the outer race 226 formed by a ring-like extension at the forward end of the driven shaft part 228.

At the rearward end, the shaft extension 10a is carried by a ball bearing 230 set in the driven shaft member 228 and adjacent to this ball bearing the shaft part 10a carries the inner race 232 of a second overrunning clutch indicated generally at 234. The rollers 236 of this clutch engage an outer race 238 also formed by the forward extension of the driven shaft part 228.

In this embodiment of the apparatus, the pump wheel is intended to be connected to the driving shaft at all times and from the descriptions of the previously described embodiments the operation of the present form of apparatus will be evident. When power is transmitted from the driving shaft through the hydraulic mechanism, the overrunning clutch 222 serves as the power transmitting coupling between the turbine wheel and the driven shaft. Since the driving shaft under such conditions is rotating at a higher speed than that of the driven shaft, the second overrunning clutch 234 overruns. If the power applied is reduced to an extent such that the driven shaft 228 tends to rotate more rapidly than the driving shaft 10, the second overrunning clutch 234 takes hold so as to couple the driving shaft and the pump wheel to the driven shaft, forcing the latter to turn the pump wheel as well as the power plant, if the latter is rigidly connected to the driving shaft 10. Under this condition the turbine wheel will turn idly under the influence of the circulation of the working fluid in the hydraulic portion of the apparatus and the overrunning clutch 222 will overrun to the extent required to compensate for the difference in speed, if any, between that of the driven shaft and that of the turbine wheel.

In the present embodiment, no reverse gear has been illustrated but it will be understood that any suitable kind of reverse gear may be employed in case reverse drive of the driven shaft is required and it will further be evident that insofar as the present invention is concerned, the reverse gears indicated in Figs. 1 and 2 may be replaced with other kinds, or omitted entirely if the installation is such that drive in only one direction is required.

While for purposes of illustration suitable examples of apparatus have been shown, it will be understood that other forms of apparatus may be employed without departing from the scope of the invention as defined in the appended claims.

What is claimed is:

1. A variable speed power transmission for transmitting power from a driving member to a driven member including variable speed hydraulic power transmitting mechanism having a pump wheel and a turbine wheel arranged in a common working chamber in which working fluid is circulated in a closed path of flow whenever the pump wheel is rotated, an overrunning clutch for transmitting power from said turbine wheel to said driven member when the turbine wheel tends to rotate faster than the driven member and a second overrunning clutch for transmitting power from the driven member to the pump wheel when the driven member tends to rotate faster than the driving member.

2. A variable speed power transmission for transmitting power from a driving member to a driven member including variable speed hydraulic power transmitting mechanism having a pump for circulating working fluid to transmit power from the driving member to the driven member, clutch means for selectively transmitting power from the driving member to said hydraulic power transmitting mechanism or directly to said driven member, an overrunning clutch interposed in the line of power transmission between said hydraulic power transmitting mechanism and said driven member, said overrunning clutch being arranged to overrun when the driven member tends to rotate faster than the driving member and a second overrunning clutch arranged to transmit power from the driven member to the driving member and to cause said pump to be operated by the driven member when the driven member tends to rotate faster than the driving member.

3. In a variable speed power transmission for transmitting power from a driving member to a driven member and having a variable speed hydraulic driving connection between said members controlled by a releasable clutch and a direct drive connection between said members controlled by a releasable friction clutch, means for selectively engaging one or the other of said clutches and an overrunning clutch arranged to engage when the driven member tends to rotate faster than the driving member to synchronize the speed of said members, whereby to permit said friction clutch to be engaged without slip.

4. In a variable speed power transmission for transmitting power from a driving element to a driven element, hydraulic power transmitting mechanism comprising a pump member and a turbine member, a sleeve member fixedly secured to the driven element, an overrunning clutch arranged to transmit power from said turbine member to said sleeve member, a releasable clutch for transmitting power from the driving element to said pump member and a direct drive connection including a second releasable clutch for transmitting power from the driving element to the driven element, said releasable clutches being disposed within said sleeve member.

5. In a variable speed power transmission for transmitting power from a driving shaft to a driven shaft, hydraulic power transmitting mechanism including a turbine member having a hollow shaft part, a pump member having a hollow shaft part extending through the hollow shaft part of the turbine member, a central shaft connected to the driving shaft and extending through the hollow shaft part of the pump member, a releasable clutch having a driving element connected to said central shaft at the side of said hydraulic mechanism remote from the driving shaft and a driven element connected to the free end of the hollow shaft part of said pump member, a second releasable clutch having a driving element connected to said central shaft on the same side of the hydraulic mechanism as the first mentioned driving element and a driven element connected to said driven shaft, a sleeve member surrounding said clutches and connected to said driven shaft and an overrunning clutch between the hollow shaft part of the turbine member and said sleeve member, said overrunning clutch being arranged to transmit power from the turbine member to the sleeve member when the turbine member tends to rotate faster than the sleeve member.

6. In a variable speed power transmission for transmitting power from a driving shaft to a driven shaft, hydraulic power transmitting mechanism including a turbine member having a hollow shaft part, a pump member having a hollow shaft part extending through the hollow shaft part of the turbine member, a central shaft connected to the driving shaft and extending through the hollow shaft part of the pump member, a releasable clutch having a driving element connected to said central shaft at the side of said hydraulic mechanism remote from the driving shaft and a driven element connected to the free end of the hollow shaft part of said pump member, a second releasable clutch having a driving element connected to said central shaft on the same side of the hydraulic mechanism as the first mentioned driving element and a driven element connected to said driven shaft, a sleeve member surrounding said clutches and connected to said driven shaft, an overrunning clutch between the hollow shaft part of the turbine member and said sleeve member, said overrunning clutch being arranged to transmit power from the turbine member to the sleeve member when the turbine member tends to rotate faster than the sleeve member and a second overrunning clutch arranged to transmit power from said driven shaft to said central shaft when the driven shaft tends to rotate faster than the central shaft.

7. In a hydraulic variable speed power transmission, a driving shaft having a pump wheel fixed thereto, a driven shaft, a turbine member having a hollow shaft part, said driving shaft extending through said hollow shaft part, an overrunning clutch arranged to transmit power from said hollow shaft part to the driven shaft and an overrunning clutch arranged on the extended end portion of said driving shaft, the first named overrunning clutch being arranged to transmit power from said turbine member to the driven shaft when the turbine member tends to rotate faster than the driven shaft and the second mentioned overrunning clutch being arranged to engage to connect the driven shaft to the driving shaft when the driven shaft tends to rotate faster than the driving shaft.

8. In a variable speed power transmission for transmitting power from a driving element to a driven element, hydraulic power transmitting mechanism providing a space for circulation of working liquid in a closed path of flow and a driving member and a driven member having parts located in said space, a first connection for transmitting power from said driving element to said driving member, a second connection for transmitting power directly from said driving element to said driven element, a pair of clutches, one of said clutches being interposed in said first connection and the second of said clutches being interposed in said second connection, actuating means for said clutches arranged to effect their release and engagement in alternation, and an overrunning clutch arranged to engage to provide a driving connection from said driven element to said driving member when the driven element tends to rotate faster than the driving member.

9. In a variable speed power transmission for transmitting power from a driving element to a driven element, hydraulic power transmitting mechanism comprising a casing providing a main chamber for working liquid and a pump member and a turbine member having parts working in said chamber, a first connection for transmitting power from said driving element to said pump member, an overrunning clutch for transmitting power from said turbine member to said driven element, a second connection for transmitting power directly from said driving element to said driven element, a pair of friction clutches one of which is interposed in said first connection and the second of which is interposed in said second connection, actuating means for causing release and engagement of said clutches in alternation and a second overrunning clutch arranged to provide a driving connection from said driven element to said pump member when the driven element tends to rotate faster than the pump member.

10. A variable speed power transmission for transmitting power to a driven member from a driving member connected to an engine, including hydraulic variable speed torque multiplying mechanism, said mechanism comprising pumping means driven by said driving member for circulating working fluid in a closed path of flow, turbine means arranged to be driven by the working fluid and permanently stationary guide vane means for changing the direction of flow of the working fluid, and means including an overrunning one-way clutch for transmitting power to the engine and to said pumping means from the driven member whenever the driven member tends to rotate faster than the driving member whereby to obtain a braking effect on the driven member due to the drag from the engine and due to the power required to cause the pumping means to circulate the working fluid through said closed path of flow.

11. In a variable speed power transmission for transmitting power from a driving element to a driven element, hydraulic power transmitting mechanism comprising a casing providing a main chamber for working liquid and a pump member and a turbine member having parts working in said chamber, said turbine member having a hollow central shaft part and said pump member having a central hollow shaft part passing through the shaft part of the turbine member, a shaft extending through said hollow pump shaft for transmitting power directly from the driving element to the driven element, a friction clutch located on the turbine side of said hydraulic mechanism for releasably connecting said shaft to said pump member, a second clutch located on the same side of the hydraulic mechanism as said friction clutch for releasably connecting said shaft to said driven member, and means providing a releasable driving connection between said turbine member and said driven element.

12. In a variable speed power transmission for transmitting power from a driving element to a driven element, hydraulic power transmitting mechanism comprising a casing providing a main chamber for working liquid and a pump member and a turbine member having parts working in said chamber, said turbine member having a hollow central shaft part and said pump member having a central hollow shaft part passing through the shaft part of the turbine member, a shaft extending through said hollow pump shaft for transmitting power directly from the driving element to the driven element, a first clutch having a driving part connected to said shaft on the turbine side of said mechanism and a driven part connected to the shaft part of said pump member, a second clutch adjacent to said first clutch, said second clutch having a driving part connected to said shaft, and a driven part connected to said driven element, and means including a power transmitting member located radially outside said clutches for transmitting power from said turbine member to said driven element.

13. In a variable speed power transmission for transmitting power from a driving element to a driven element, hydraulic power transmitting mechanism comprising a casing providing a main chamber for working liquid and a pump member and a turbine member having parts working in said chamber, a first connection for transmitting power from the driving element to said pump member, a second connection for transmitting power directly from the driving element to the driven element, two clutches located adjacent to each other on the turbine side of said hydraulic mechanism and arranged to be engaged in alternation, one of said clutches being interposed in said first connection and the other of said clutches being interposed in said second connection, and a hollow sleeve member around said clutches providing a driving connection for transmitting power from said turbine member to said driven element.

ALF LYSHOLM.
GUSTAV KARL WILLIAM BOESTAD.